(12) United States Patent
Balle et al.

(10) Patent No.: US 12,182,616 B2
(45) Date of Patent: Dec. 31, 2024

(54) PLATFORM HEALTH ENGINE IN INFRASTRUCTURE PROCESSING UNIT

(71) Applicant: Intel Corporation, Santa Clara, CA (US)

(72) Inventors: Susanne M. Balle, Hudson, NH (US); Yamini Nimmagadda, Portland, OR (US); Olugbemisola Oniyinde, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 17/484,099

(22) Filed: Sep. 24, 2021

(65) Prior Publication Data

US 2022/0019461 A1 Jan. 20, 2022

(51) Int. Cl.
*G06F 9/48* (2006.01)
*G06F 11/00* (2006.01)
*G06F 11/20* (2006.01)
*G06F 11/30* (2006.01)
*G06F 11/34* (2006.01)
*G06N 20/00* (2019.01)

(52) U.S. Cl.
CPC .......... *G06F 9/4856* (2013.01); *G06F 9/4881* (2013.01); *G06F 11/2023* (2013.01); *G06F 11/203* (2013.01); *G06F 11/3024* (2013.01); *G06F 11/3476* (2013.01); *G06F 11/3495* (2013.01); *G06N 20/00* (2019.01); *G06F 11/008* (2013.01)

(58) Field of Classification Search
None
See application file for complete search history.

(56) References Cited

U.S. PATENT DOCUMENTS

| | | | |
|---|---|---|---|
| 2021/0383206 A1* | 12/2021 | Teppoeva | G06F 11/004 |
| 2022/0091915 A1* | 3/2022 | Perneti | G06F 3/0653 |

* cited by examiner

*Primary Examiner* — Qing Yuan Wu
(74) *Attorney, Agent, or Firm* — Banner & Witcoff Ltd.

(57) ABSTRACT

A platform health engine for autonomous self-healing in platforms served by an Infrastructure Processing Unit (IPU), including: an analysis processor configured to apply analytics to telemetry data received from a telemetry agent of a monitored platform managed by the IPU, and to generate relevant platform health data; a prediction processor configured to predict, based on the relevant platform health data, a future health status of the monitored platform; and a dispatch processor configured to dispatch a workload of the monitored platform to another platform managed if the predicted future health status of the monitored platform is failure.

21 Claims, 2 Drawing Sheets

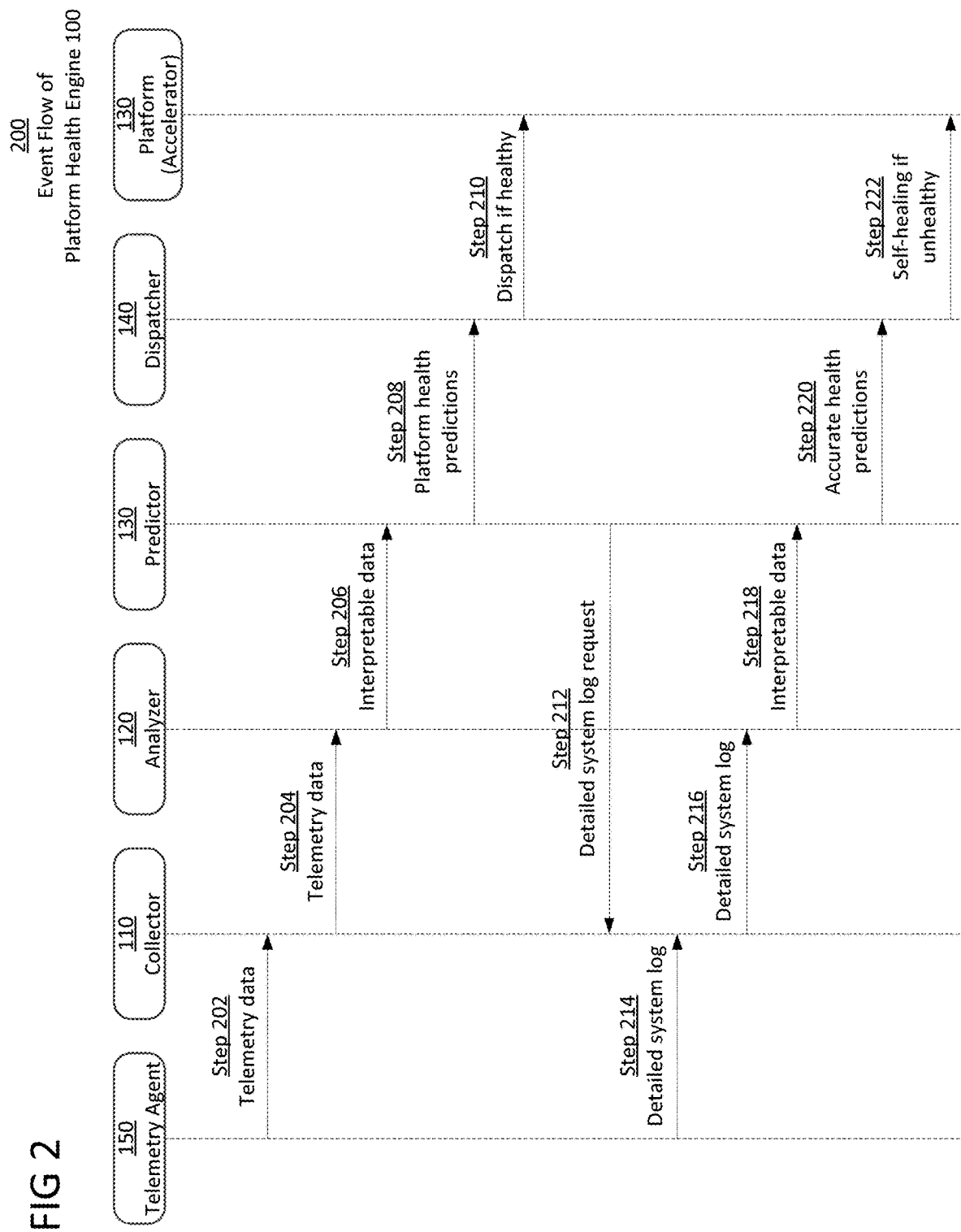

PLATFORM HEALTH ENGINE IN INFRASTRUCTURE PROCESSING UNIT

TECHNICAL FIELD

The present disclosure relates to an infrastructure processing unit (IPU) having a platform health engine for self-healing in a platform.

BACKGROUND

In disaggregated computing, an infrastructure processing unit (IPU) manages accelerators and processing units by dispatching workloads without the involvement of a host central processing unit (CPU). An accelerator (xPU) is a cross-architecture computing solution across chip types (e.g., CPUs, GPUs, FPGAs, ASIC and other accelerators), together in a single application programming interface, which assigns each task to the chip suited for the particular task. During operation the accelerators may fail due to temperature issues, electrical issues, platform longevity, overuse, etc.

BRIEF DESCRIPTION OF THE DRAWINGS

FIG. 2 illustrates an event flow diagram of the platform health engine in accordance with aspects of the disclosure.

DESCRIPTION OF THE ASPECTS

Figure 1:
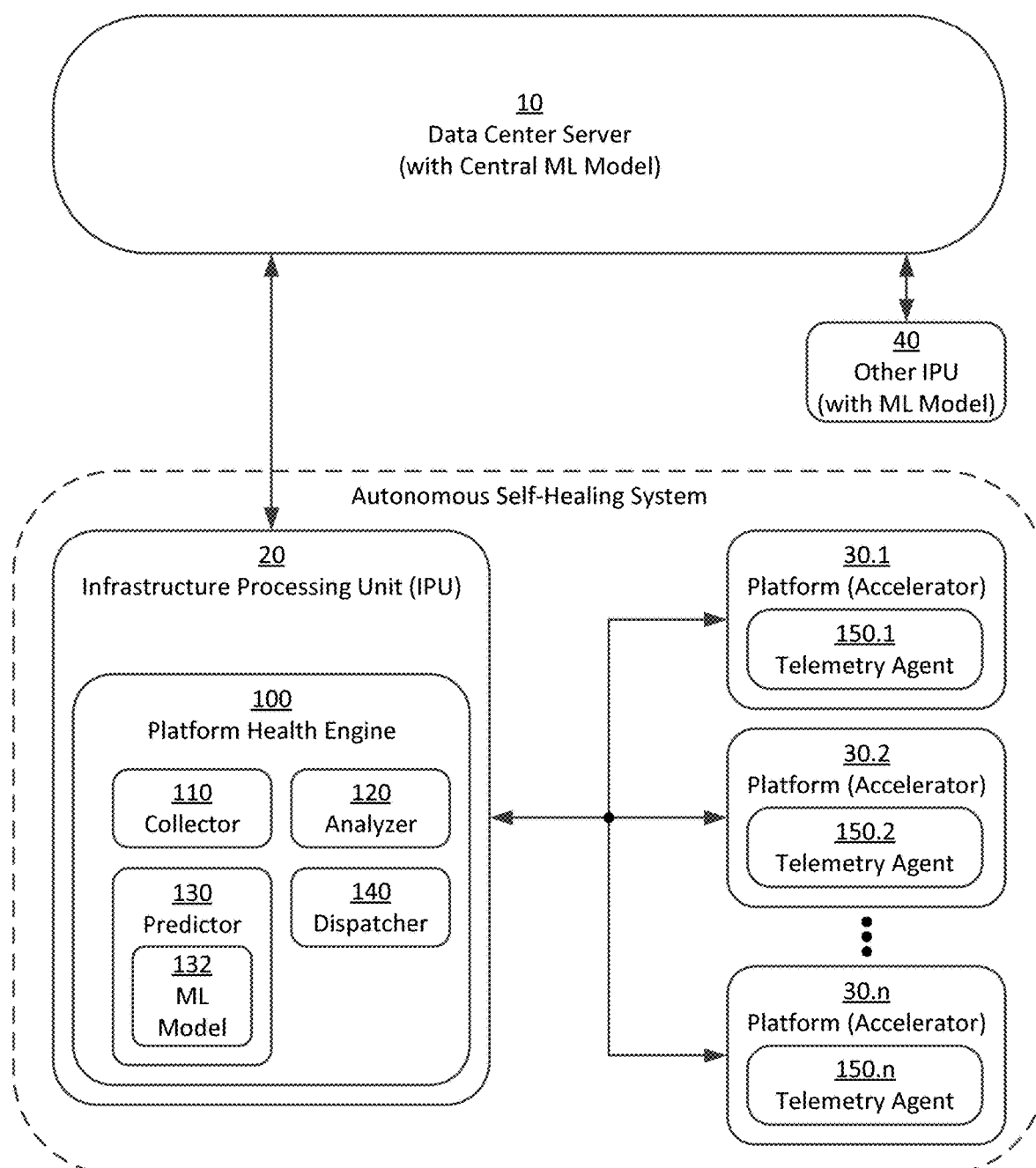
FIG. 1 illustrates a schematic diagram of a platform health engine in an infrastructure processing unit (IPU) configured to manage disaggregated platforms in accordance with aspects of the disclosure.

The present disclosure is directed to a platform health engine within the infrastructure processing unit (IPU) or data processing unit (DPU). The health engine analyzes telemetry data collected from disaggregated platform components (e.g., accelerators). Before a platform fails unexpectedly, the IPU performs self-healing steps, such as moving a workload to another platform to continue execution of the workload and/or perform remedial steps to bring the platform back to a heathy state. To reduce the latency of the workload movement, there is a need to track the health of the platform and place or move the workload before the platform fails and causes workload disruption.

FIG. 1 illustrates a schematic diagram of a platform health engine 100 in an infrastructure processing unit (IPU) 20 configured to manage disaggregated platforms 30, and FIG. 2 illustrates an event flow diagram 200 of the platform health engine in accordance with aspects of the disclosure.

The platform health engine 100 comprises a collector 110, an analyzer 120, a predictor 130, and a dispatcher 140. By way of overview, the platform health engine is configured to analyze telemetrically-received platform data collected from a platform 30 (e.g., an accelerator, storage, memory, interconnect link . . . ). This telemetry data is analyzed to predict a platform failure so that the IPU 20 may act to dispatch or migrate a workload to another, healthy platform 30 for autonomous self-healing.

The collector (collection processor) 110 is configured to collect, and provide to the analyzer 120, system log data and the telemetry data from the telemetry agent 150 of the platform 30 managed by the IPU 20 and being monitored, as indicated in FIG. 2, steps 202 and 204. The collector 110 may be configured to collect the telemetry data periodically, or alternatively, upon a triggering event. The triggering event may be an environmental (e.g., ambient temperature), platform failure, load based (e.g., number of workloads, network congestion), or a request from the predictor 130, and the telemetry data may be, for example, crash logs, system logs, etc.

The collected telemetry data provides information about platform health. Many types of telemetric data and system logs may be collected in order to have a good understanding of that status of platform components that could result in the platform 30 failing. The disclosure is not limited to the types of data. The platform health data may include, for example, thermal data, vibration data, utilization data, error, or the like. The thermal data may include, for example, temperature, power, etc. The utilization data may include Instruction per Cycle (IPC), etc. The errors may include memory errors such as a memory read error (corrected or uncorrected), memory data corruption, etc. The system log (syslog) comprises, for example, a record of operating system (OS) events that indicates how system processes and drivers were loaded. The syslog may include informational, error and warning events related to the OS.

The analyzer (analysis processor) 120 is configured to apply analytics to the telemetry data received from a telemetry agent 150 of the monitored platform 30, and to generate relevant, interpretable platform health data to be provided to the predictor 130, as indicated in FIG. 2, Step 206. The analyzer 120 converts bulk data from logs and other telemetric data sources into a smaller set of relevant data for a specific purpose. The analyzer 120 may comprise one or more filters (not shown) configured to filter the telemetry data in order to separate the relevant information for a given health prediction from the non-relevant data, and convert the relevant platform health data into a format interpretable by the predictor 130. A filter could be defined around FPGA temperature, clock speed, and FPGA fabric usage, for example. Such a filter filters the data and writes relevant data to a file, database, or in memory to be processed by the predictor 130.

The predictor (prediction processor) 130 is configured to predict, based on the relevant platform health data it receives from the analyzer 120, a future health status of the monitored platform 20. The predictor 130 provides the prediction to the dispatcher 140, as indicated in FIG. 2, Step 208. If the predicted future health status of the monitored platform 30 is failure or unclear, the predictor 130 may be configured to request the collector 110 to provide the analyzer 120 with additional telemetry data (e.g., different or more detailed system log and/or telemetry data) from the telemetry agent 150 of the monitored platform 30, as indicated in FIG. 2, Steps 212, 214, and 216. The analyzer 120 applies analytics to the system log and/or telemetry data, and generates and provides to the predictor 130 relevant, interpretable platform health data, as indicated in FIG. 2, Step 218. The predictor 130 is configured to predict, more accurately based on the additional telemetry data, the future health status of the monitored platform 30. The predictor 130 then provides this more accurate prediction to the dispatcher 220, as indicated in FIG. 2, Step 220. The predictor 130 may be configured to provide the IPU 20 via the dispatcher 140 a recommended self-healing action based on the relevant platform health data, as indicated in FIG. 2, Step 222.

As an example, a platform component monitored for possible failure is a field programmable gate array (FPGA) monitored for temperature issues, power issues, memory errors, network errors, etc. For example, if the temperature rises above a certain threshold, the FPGA could be damaged or unreliable. The predictor 130 could provide a recommended self-healing action, such as to throttle the FPGA to run at a lower frequency and thereby lower the FPGA's temperature, and of course its performance. The predictor 130 may also recommend changing the clock speed or the availability of the FPGA so that no additional workload is scheduled until the FPGA is once again in a healthy state. The monitored telemetric data may include metrics for hardware, firmware, software, OS, network, storage, platform 30, IPU 20, etc. Another example is when the platform 30 stops responding to the IPU 20, and based on the non-existent information the platform health engine 100 is receiving, the predictor 130 can reset the platform 30 to its initial state to see if the platform 30 begins functioning properly again. If resetting does not resolve the problem, the IPU 20 can reconfigure its networking endpoint to another platform 30.

In accordance with another aspect, the predictor 130 may be configured to host a machine learning model 132 of a machine learning algorithm for predicting the future health status of the monitored platform 30. The prediction using the machine learning model 132 may be based on previous data and errors. The predictor 130 uses the machine learning algorithm to correlate past information into a more accurate prediction of the future health status of the monitored platform 30. The predictor 130 may also host a local training set that allows the predictor 130 to continuously learn and update its model periodically. The predictor 130 continuously learns through training its machine learning model as new data for the platform 30 becomes available, resulting in more accurate predictions. The machine learning algorithm may include anything from a threshold algorithm to a more complicated algorithm, such as an artificial neural network or support vector machine (SVM). Many algorithms exist and are in the process of being developed. This disclosure is not limited to any particular machine learning algorithm.

Further, a central machine learning model may be hosted in the data center server 10 serving the IPU 20. At relevant intervals the data center server 10 may be configured to update weights in the local machine learning model 132. Also, the data center server 10 may be configured to provide the IPU 20 with data from another IPU 40 served by the data center server 10. The IPU 20 updates and learns from its local data set, as well as merges in the larger data center set in order to consider data from other IPUs 40 with similar hardware.

The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning model described herein may take any suitable form or utilize any suitable technique (e.g., for training purposes). For example, any of the machine learning models may utilize supervised learning, semi-supervised learning, unsupervised learning, or reinforcement learning techniques.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

The dispatcher (dispatch processor) 140 is configured to dispatch a workload of the monitored platform 30 (any of 30.1-30.$n$) to another platform 30 (any other of 30.1-30.$n$) managed by the IPU 20 (or managed by another IPU) if the predicted future health status of the monitored platform 30 is failure or unclear, as indicated in FIG. 2, Step 222. Since the prediction is made ahead of time before platform failure, the dispatcher 140 can migrate the workload without any disruption or delay. The dispatcher 140 is configured to dispatch the workload of the monitored platform 30 to the other, healthy platform 30 by replicating the workload of the monitored platform 30 on the other platform 30 while the monitored platform 30 continues to run the workload. On the other hand, if the predicted future health status of the monitored platform 30 is non-failure (healthy), the dispatcher 140 is configured to continue to dispatch the workload of the monitored platform 30 to the monitored platform 30, as indicated in FIG. 2, Step 210.

The disclosed platform health engine 100 is advantageous in that it is hosted in the IPU 20. The platform health engine 100 is independent and in its own domain that is separate from the host CPU/server. This enables a platform health check on headless platforms (accelerators), that is, platforms without a host CPU and only accelerators. Since the IPU 20 is the interface between the data center server 10 and the platforms 30, the platform health engine 100 is able to move workloads between accelerators 30 managed by the IPU 30 or another IPU 40 by predicting the platform health (success/failure) and resource availability before a given platform 30 becomes unstable or fails.

The term "processor" as, for example, used herein may be understood as any kind of technological entity that allows handling of data. The data may be handled according to one or more specific functions executed by the processor. Further, a processor as used herein may be understood as any kind of circuit, e.g., any kind of analog or digital circuit. A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like. Processors may further be integrated into System-On-a-Chip (SOC) devices.

Any of the processors (collection processor 110, analysis processor 120, prediction processor 130, and/or dispatch processor 140) disclosed herein may be configured to perform certain functions in accordance with program instructions which may be stored in a memory. In other words, a memory may store software that, when executed by a processor, controls the operation of the system. A memory may store one or more databases, as well as a trained system, such as a neural network, or a deep neural network, for example. The memory may include any number of random access memories, read only memories, flash memories, disk drives, optical storage, tape storage, removable storage and other types of storage. In the drawings, some structural or method features may be shown in specific arrangements and/or orderings. However, it should be appreciated that such specific arrangements and/or orderings may not be required. Rather, in some aspects, such features may be arranged in a different manner and/or order than shown in the illustrative figures. Additionally, the inclusion of a structural or method feature in a particular figure is not meant to imply that such feature is required in all aspects and, in some aspects, may not be included or may be combined with other features.

The techniques of this disclosure may also be described in the following examples.

Example 1. A platform health engine for autonomous self-healing in platforms served by an Infrastructure Processing Unit (IPU), comprising: an analysis processor configured to apply analytics to telemetry data received from a telemetry agent of a monitored platform managed by the IPU, and to generate relevant platform health data; a prediction processor configured to predict, based on the relevant platform health data, a future health status of the monitored platform; and a dispatch processor configured to dispatch a workload of the monitored platform to another platform if the predicted future health status of the monitored platform is failure.

Example 2. The platform health engine of claim 1, further comprising: a collection processor configured to collect, and provide to the analysis processor, the telemetry data from the telemetry agent of the monitored platform.

Example 3. The platform health engine of claim 2, wherein if the predicted future health status of the monitored platform is unclear or failure, the prediction processor is configured to request the collection processor to provide the analysis processor with additional telemetry data of the monitored platform.

Example 4. The platform health engine of claim 3, wherein the prediction processor is configured to predict, more accurately based on the additional telemetry data, the future health status of the monitored platform.

Example 5. The platform health engine of claim 2, wherein the collection processor is configured to collect the telemetry data from the telemetry agent of the monitored platform periodically.

Example 6. The platform health engine of claim 2, wherein the collection processor is configured to collect the telemetry data from the telemetry agent of the monitored platform upon a triggering event.

Example 7. The platform health engine of claim 6, wherein the triggering event is a platform failure or a request from the prediction processor.

Example 8. The platform health engine of claim 1, wherein the dispatch processor is configured to dispatch the workload of the monitored platform to the other platform by replicating the workload of the monitored platform on the other platform while the monitored platform continues to run the workload.

Example 9. The platform health engine of claim 1, wherein if the predicted future health status of the monitored platform is non-failure, the dispatch processor is configured to continue to dispatch the workload of the monitored platform to the monitored platform.

Example 10. The platform health engine of claim 1, wherein the prediction processor is configured to provide the IPU with a recommended self-healing action based on the relevant platform health data.

Example 11. The platform health engine of claim 1, wherein the prediction processor is configured to predict the future health status of the monitored platform using a machine learning algorithm.

Example 12. The platform health engine of claim 11, wherein the prediction processor is configured to host a local machine learning model of the machine learning algorithm.

Example 13. The platform health engine of claim 12, wherein a central machine learning model is hosted in a data center server that serves the IPU, and used to update weights of the local machine learning model.

Example 14. The platform health engine of claim 13, wherein the prediction processor is configured to receive from the data center server data from another IPU served by the data center server.

Example 15. The platform health engine of claim 1, wherein the analysis processor comprises one or more filters configured to filter out non-relevant data from the telemetry data, and convert the relevant platform health data to a format readable by the prediction processor.

Example 16. The platform health engine of claim 1, wherein the monitored platform is an accelerator.

Example 17. The platform health engine of claim 1, wherein the platform health data is selected from the group consisting of thermal data, vibration data, utilization data, and memory errors.

Example 18. A platform health engine for autonomous self-healing in platforms served by an Infrastructure Processing Unit (IPU), comprising: an analyzing means for applying analytics to telemetry data received from a telemetry agent of a monitored platform managed by the IPU, and for generating relevant platform health data; a predicting means for predicting, based on the relevant platform health data, a future health status of the monitored platform; and a dispatching means for dispatching a workload of the monitored platform to another platform if the predicted future health status of the monitored platform is failure.

Example 19. The platform health engine of claim 18, further comprising: a collecting means for collecting, and for providing to the analyzing means, the telemetry data from the telemetry agent of the monitored platform.

Example 20. The platform health engine of claim 18, wherein the monitored platform is an accelerator.

Example 21. The platform health engine of claim 18, wherein the dispatching means is further for dispatching the workload of the monitored platform to the other platform by replicating the workload of the monitored platform on the other platform while the monitored platform continues to run the workload.

Example 22. A method for autonomous self-healing in platforms served by an Infrastructure Processing Unit (IPU), comprising: applying, by an analysis processor, analytics to telemetry data received from a telemetry agent of a monitored platform managed by the IPU; generating, by the analysis processor, relevant platform health data; predicting, by a prediction processor based on the relevant platform health data, a future health status of the monitored platform; and dispatching, by a dispatch processor, a workload of the monitored platform to another platform if the predicted future health status of the monitored platform is failure.

Example 23. The method of claim 22, further comprising: dispatching, by the dispatch processor, the workload of the monitored platform to the other platform by replicating the workload of the monitored platform on the other platform while the monitored platform continues to run the workload.

Example 24. A non-transient computer-readable storage medium storing instruction which, when executed by a processor, implement the method for autonomous self-healing in platforms served by the IPU according to claim 22.

Example 25. A data center system comprising: an Infrastructure Processing Unit (IPU); and the platform health engine according to claim 1.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A platform health engine for autonomous self-healing in platforms served by an Infrastructure Processing Unit (IPU), comprising:
   an analysis processor configured to apply analytics to telemetry data received from a telemetry agent of a monitored platform managed by the IPU, and to generate relevant platform health data;
   a prediction processor configured to predict, based on the relevant platform health data, a future health status of the monitored platform;
   a dispatch processor configured to dispatch a workload of the monitored platform to another platform if the predicted future health status of the monitored platform is failure; and
   a collection processor configured to collect, and provide to the analysis processor, the telemetry data from the telemetry agent of the monitored platform,
   wherein if the predicted future health status of the monitored platform is unclear or failure, the prediction processor is configured to request the collection processor to provide the analysis processor with additional telemetry data of the monitored platform.

2. The platform health engine of claim 1, wherein the prediction processor is configured to predict, more accurately based on the additional telemetry data, the future health status of the monitored platform.

3. The platform health engine of claim 1, wherein the collection processor is configured to collect the telemetry data from the telemetry agent of the monitored platform periodically.

4. The platform health engine of claim 1, wherein the collection processor is configured to collect the telemetry data from the telemetry agent of the monitored platform upon a triggering event.

5. The platform health engine of claim 4, wherein the triggering event is a platform failure or a request from the prediction processor.

6. The platform health engine of claim 1, wherein the dispatch processor is configured to dispatch the workload of the monitored platform to the other platform by replicating the workload of the monitored platform on the other platform while the monitored platform continues to run the workload.

7. The platform health engine of claim 1, wherein if the predicted future health status of the monitored platform is non-failure, the dispatch processor is configured to continue to dispatch the workload of the monitored platform to the monitored platform.

8. The platform health engine of claim 1, wherein the prediction processor is configured to provide the IPU with a recommended self-healing action based on the relevant platform health data.

9. The platform health engine of claim 1, wherein the prediction processor is configured to predict the future health status of the monitored platform using a machine learning algorithm.

10. The platform health engine of claim 9, wherein the prediction processor is configured to host a local machine learning model of the machine learning algorithm.

11. The platform health engine of claim 10, wherein a central machine learning model is hosted in a data center server that serves the IPU, and used to update weights of the local machine learning model.

12. The platform health engine of claim 11, wherein the prediction processor is configured to receive from the data center server data from another IPU served by the data center server.

13. The platform health engine of claim 1, wherein the analysis processor comprises one or more filters configured to filter out non-relevant data from the telemetry data, and convert the relevant platform health data to a format readable by the prediction processor.

14. The platform health engine of claim 1, wherein the monitored platform is an accelerator.

15. The platform health engine of claim 1, wherein the platform health data is selected from the group consisting of thermal data, vibration data, utilization data, and memory errors.

16. A data center system comprising:
   an Infrastructure Processing Unit (IPU); and
   the platform health engine according to claim 1.

17. A platform health engine for autonomous self-healing in platforms served by an Infrastructure Processing Unit (IPU), comprising:
   an analyzing means for applying analytics to telemetry data received from a telemetry agent of a monitored platform managed by the IPU, and for generating relevant platform health data;
   a predicting means for predicting, based on the relevant platform health data, a future health status of the monitored platform; and
   a dispatching means for dispatching a workload of the monitored platform to another platform if the predicted future health status of the monitored platform is failure by replicating the workload of the monitored platform on the other platform while the monitored platform continues to run the workload.

18. The platform health engine of claim 17, further comprising:

a collecting means for collecting, and for providing to the analyzing means, the telemetry data from the telemetry agent of the monitored platform.

19. The platform health engine of claim 17, wherein the monitored platform is an accelerator.

20. A method for autonomous self-healing in platforms served by an Infrastructure Processing Unit (IPU), comprising:
- applying, by an analysis processor, analytics to telemetry data received from a telemetry agent of a monitored platform managed by the IPU;
- generating, by the analysis processor, relevant platform health data;
- predicting, by a prediction processor based on the relevant platform health data, a future health status of the monitored platform; and
- dispatching, by a dispatch processor, a workload of the monitored platform to another platform if the predicted future health status of the monitored platform is failure by replicating the workload of the monitored platform on the other platform while the monitored platform continues to run the workload.

21. A non-transient computer-readable storage medium storing instruction which, when executed by a processor, implement the method for autonomous self-healing in platforms served by the IPU according to claim 20.

* * * * *